United States Patent
Srinivasan et al.

(10) Patent No.: US 11,860,420 B2
(45) Date of Patent: Jan. 2, 2024

(54) MICROGEAR PHOTONIC CRYSTAL PATTERNING FOR CHIP-INTEGRATED OPTICAL RING RESONATORS

(71) Applicants: University of Maryland, College Park, College Park, MD (US); Government of the United States of America, as Represented by the Secretary of Commerce, Gaithersburg, MD (US)

(72) Inventors: Kartik Srinivasan, Rockville, MD (US); Xiyuan Lu, Montgomery Village, MD (US)

(73) Assignees: University of Maryland, College Park, College Park, MD (US); Government of the United States of America, as Represented by the Secretary of Commerce, Gaithersburg, MD (US)

( * ) Notice: Subject to any disclaimer, the term of this patent is extended or adjusted under 35 U.S.C. 154(b) by 0 days.

(21) Appl. No.: 17/674,079

(22) Filed: Feb. 17, 2022

(65) Prior Publication Data
US 2022/0260782 A1 Aug. 18, 2022

Related U.S. Application Data

(60) Provisional application No. 63/150,637, filed on Feb. 18, 2021.

(51) Int. Cl.
*G02B 6/12* (2006.01)
*G02B 6/122* (2006.01)
(Continued)

(52) U.S. Cl.
CPC ......... *G02B 6/29341* (2013.01); *G02B 6/122* (2013.01); *G02B 6/12007* (2013.01);
(Continued)

(58) Field of Classification Search
CPC .... B82Y 20/00; G02B 6/12007; G02B 6/122; G02B 6/29338; G02B 6/29341; G02B 2006/121; G02F 2203/15
See application file for complete search history.

(56) References Cited

U.S. PATENT DOCUMENTS 7,941,015 B2 * 5/2011 Bratkovski ............. H01L 33/24
  385/32
9,103,975 B2 * 8/2015 Yu .......................... G02B 6/124
(Continued)

FOREIGN PATENT DOCUMENTS

| CN | 105591284 A | * | 5/2016 | |
| CN | 110165346 A | * | 8/2019 | .......... H01P 1/20309 |
| CN | 111129685 A | * | 5/2020 | |

OTHER PUBLICATIONS

Zhang et al., "Slow-Light Dispersion in One-Dimensional Photonic Crystal Racetrack Ring Resonator", IEEE Photonics Technology Letters, vol. 27, No. 10, May 15, 2015, pp. 1120-1123.
(Continued)

*Primary Examiner* — Ryan A Lepisto
(74) *Attorney, Agent, or Firm* — Carter, DeLuca & Farrell LLP; George Likourezos

(57) ABSTRACT

An optical cavity includes a ring defining an internal boundary and an external boundary, at least one of which is periodically modulated to define a gear-shaped configuration including a plurality of teeth, thereby enabling a plurality of slow-light modes. At least one physical defect may be defined within the periodically modulated internal boundary and/or external boundary to thereby enable at least one localized mode. At least one waveguide is coupled to the ring.

28 Claims, 7 Drawing Sheets

(51) Int. Cl.
*G02B 6/293* (2006.01)
*B82Y 20/00* (2011.01)

(52) U.S. Cl.
CPC .......... *G02B 6/29338* (2013.01); *B82Y 20/00* (2013.01); *G02F 2203/15* (2013.01)

(56) References Cited

U.S. PATENT DOCUMENTS

| | | | |
|---|---|---|---|
| 9,670,476 B2* | 6/2017 | Mao | C12Q 1/48 |
| 9,720,178 B2* | 8/2017 | Stoeferle | G02B 6/29338 |
| 10,185,205 B2* | 1/2019 | Popovic | G02F 1/0118 |
| 10,374,118 B2* | 8/2019 | Alloatti | H01L 31/1105 |
| 10,996,538 B2* | 5/2021 | Popovic | G02B 6/29338 |

OTHER PUBLICATIONS

Zhang et al., "High-quality-factor photonic crystal ring resonator", Optics Letters, vol. 39, No. 5, Mar. 1, 2014, pp. 1282-1285.

McGarvey-Lechable et al., "Slow light in mass-produced, dispersion-engineered photonic crystal ring resonators", Optics Express, vol. 25, No. 4, Feb. 20, 2017, pp. 3916-3926.

Lee et al., "Slow-light dispersion in periodically patterned silicon microring resonators," Optic Letters, vol. 37, No. 1, Jan. 1, 2012, pp. 58-60.

Gao et al., "Air-mode photonic crystal ring resonator on silicon-on-insulator", Scientific Reports, Jan. 28, 2016, pp. 1-6.

* cited by examiner

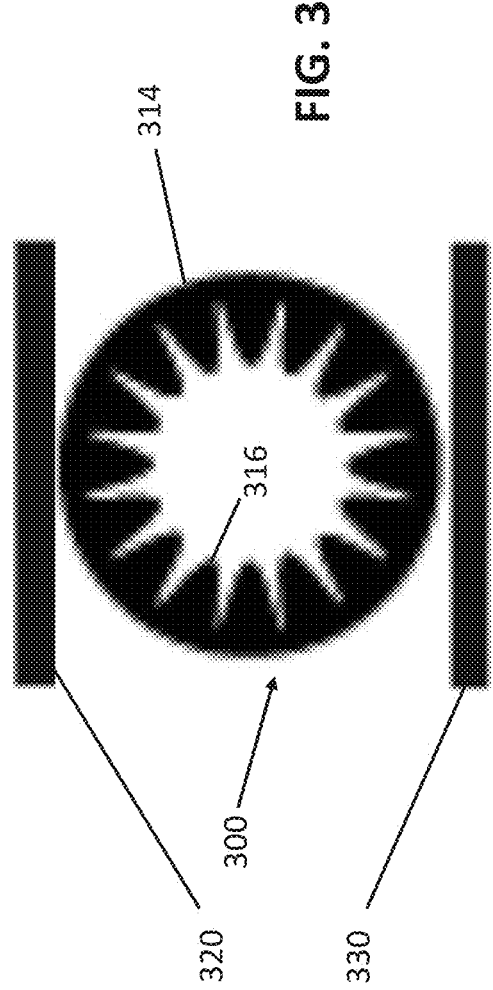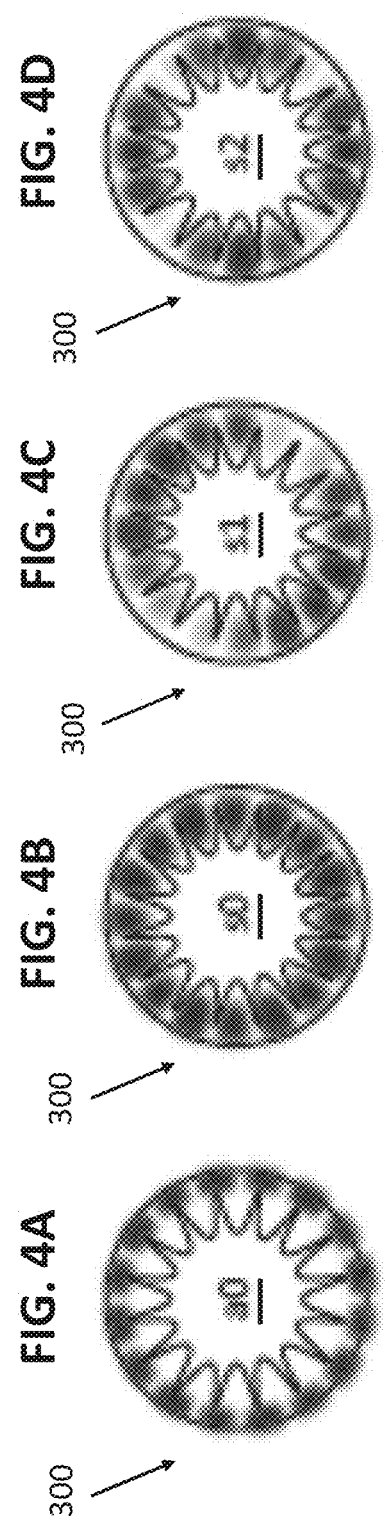

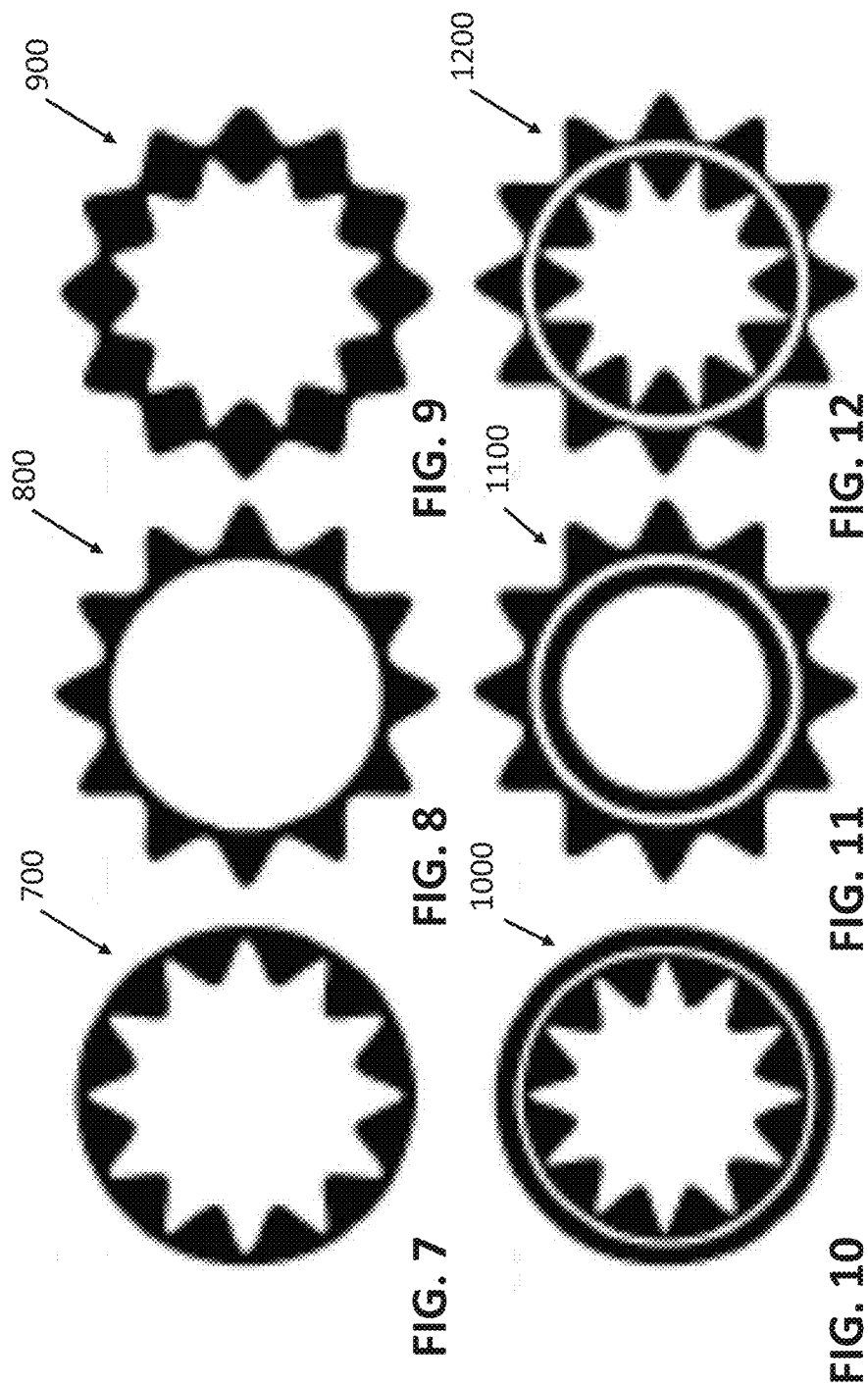

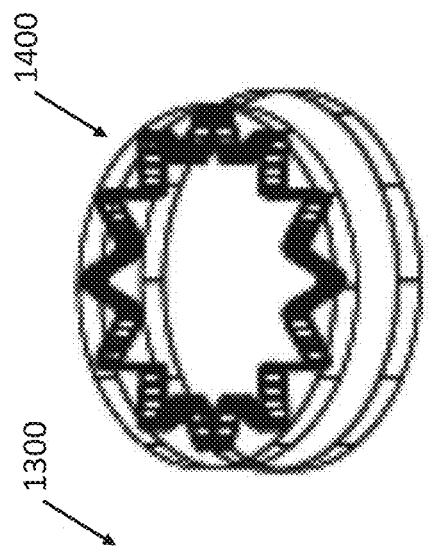
FIG. 13
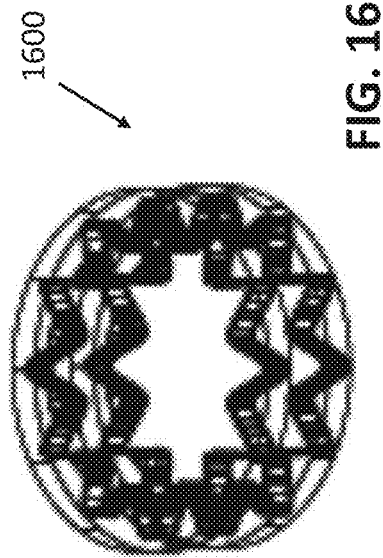
FIG. 14
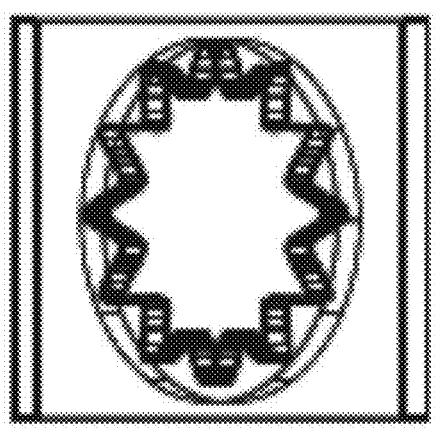
FIG. 15
FIG. 16

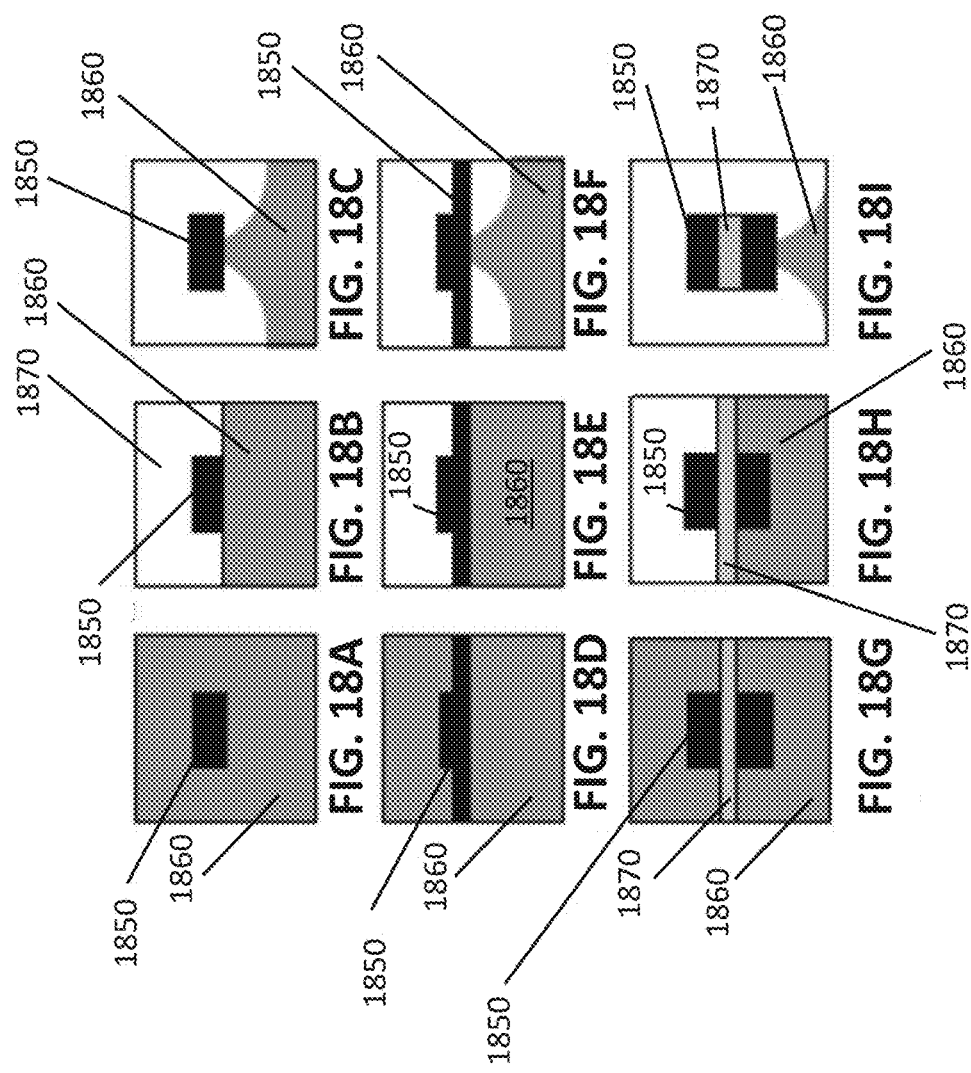
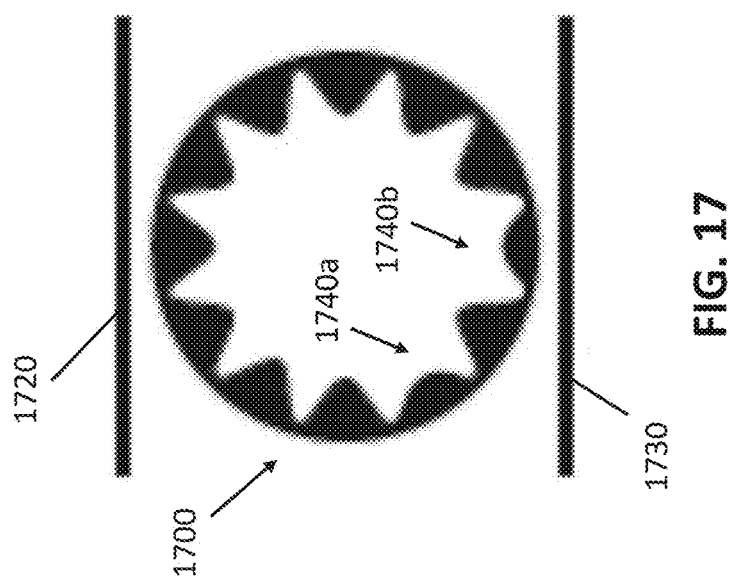

| Materials | n (at 1550 nm) | Advantages | Applications |
|---|---|---|---|
| silicon (Si) | 3.48 | high-quality crystal; CMOS compatible | quantum application; interconnects/filters |
| gallium arsenide (GaAs) | 3.37 | incorporation of light-emitting media | quantum sources and gates; lasers |
| indium phosphide (InP) | 3.16 | incorporation of telecommunications light-emitting media | telecom quantum technologies; lasers |
| silicon carbide (SiC) | 2.6 | robust, high quality crystalline, solid-state spin defects | high-power devices; quantum applications |
| diamond | 2.39 | color-center defects and spins | quantum sensors and quantum memories |
| lithium niobate (LiNbO$_3$) | 2.2 | poling capability; electrical-optical response | nonlinear optics; miniaturized modulators |
| aluminum nitride (AlN) | 2.0 | electrical-optical response | miniaturized modulators |
| silicon dioxide (SiO$_2$) | 1.44 | ultra-high quality factor | stimulated Brillouin scattering |

FIG. 19

MICROGEAR PHOTONIC CRYSTAL PATTERNING FOR CHIP-INTEGRATED OPTICAL RING RESONATORS

CROSS-REFERENCE TO RELATED APPLICATION

This application claims the benefit of and priority to U.S. Provisional Patent Application Ser. No. 63/150,637, filed on Feb. 18, 2021, the entire contents of which are incorporated by reference herein.

STATEMENT REGARDING FEDERALLY SPONSORED RESEARCH/DEVELOPMENT

This invention was made with Government support under W911NF2120106 awarded by the Department of the Army, Army Research Office and under 70NANB10H193 awarded by the National Institute of Standards and Technology (NIST). The Government has certain rights in the invention.

FIELD

The present disclosure relates to integrated optical resonators (also referred to as integrated optical cavities) configured for use in chip-integrated sensing/detection, light generation/conversion, cavity quantum electrodynamics with enhanced light-matter intensities, and/or other applications.

BACKGROUND

Chip-integrated optical microresonators are utilized in a variety of photonic technologies including lasers, quantum light sources, transducers, frequency combs, etc. Such optical microresonators can generally be classified as one of two types of optical microresonators: photonic crystal defect cavities (based on localizing defects in one or two-dimensional photonic lattices) and whispering gallery cavities (based on total internal reflection at the periphery of the device). Photonic crystal defect cavities are characterized by their ultra-strong modal confinement but have challenges with respect to working at multiple wavelengths, fabrication sensitivity, and scalability, and due to their non-intuitive design. Whispering gallery cavities have a more intuitive design, are less demanding to fabricate and scale, are able to operate at multiple wavelengths simultaneously, and provide high quality factors in general, but do not confine light as strongly.

SUMMARY

The present disclosure provides optical cavities, e.g., microcavities, configured for use in chip-integrated sensing/detection, light generation/conversion, cavity quantum electrodynamics with enhanced light-matter intensities, and/or other applications. The optical cavities of the present disclosure leverage the advantages of both photonic crystal defect cavities and whispering gallery cavities while reducing or eliminating the drawbacks of each. More specifically, optical cavities in accordance with the present disclosure advantageously provide a high-Q (such that light persists in the cavity for a longer amount of time before dissipating as compared to conventional devices, thereby increasing interaction time), low group velocity/high slowdown ratio (SR) (such that light propagates more slowly than in conventional devices, also increasing interaction time), and small mode volume (such that the per photon electric field strength in the cavity is increased compared to conventional devices, thereby increasing the interaction rate). Further, optical cavities in accordance with the present disclosure provide tunable coupling to an access waveguide(s) and enable simultaneous multi-mode use. The features above (among others) make the optical cavities of the present disclosure suitable for use in a wide variety of applications, e.g., as chip-integrated optical microresonators, including, without limitation: linear optics (including spectroscopy, interferometry, and sensing); nonlinear optics (e.g., for nonlinear wave mixing processes like optical parametric oscillation); and quantum optics (including strongly-coupled cavity-quantum emitter systems that can form the basis of deterministic quantum gates).

Terms including "generally," "about," "substantially," and the like, as utilized herein, are meant to encompass variations, e.g., tolerances, measurement variations, and/or other variations, and, to the extent consistent with standards in the art, may extend up to and including plus or minus 10 percent. To the extent consistent, any of the aspects and/or features detailed herein may be used in conjunction with any or all of the other aspects and/or features described herein. Particular aspects and features of the present disclosure are detailed below.

Provided in accordance with aspects of the present disclosure is an optical cavity that includes a ring defining an internal boundary and an external boundary. At least one of the internal boundary or the external boundary is periodically modulated to define a gear-shaped configuration including a plurality of teeth, thereby enabling a plurality of slow-light modes. In aspects, at least one waveguide is coupled to the ring.

In an aspect of the present disclosure, the optical cavity defines mirror symmetry, symmetry in an angular momentum shift created by the periodic modulation, and rotational symmetry.

In another aspect of the present disclosure, at least one slow-light mode of the plurality of slow-light modes has an optical quality factor (Q) of at least about $1.1 \times 10^6$ and a group velocity slowdown ratio (SR) of at least about 10.

In still another aspect of the present disclosure, at least one slow-light mode of the plurality of slow-light modes has an ng/a, wherein ng is the group index and a is the loss coefficient, of at least about 17 cm or, in aspects, of at least about 28 cm.

In yet another aspect of the present disclosure, the periodically modulated at least one of the internal boundary or the external boundary includes at least one physical defect defined therein, thereby enabling at least one localized mode.

In still yet another aspect of the present disclosure, the at least one physical defect includes a localized reduction in amplitude of at least one tooth of the plurality of teeth.

In another aspect of the present disclosure, the at least one physical defect defines a defect angle θ=0 relative to the coupling of the waveguide with the ring.

In another aspect of the present disclosure, the at least one localized mode has an optical quality factor (Q) to mode volume (V) ratio (Q/V) of at most about $5.5(\lambda/n)^3$, where λ is an operating wavelength and n is a refractive index of a core waveguiding layer of the ring.

In still another aspect of the present disclosure, the internal boundary is periodically modulated to define the gear-shaped configuration and the external boundary is substantially circular. Alternatively, the external boundary is periodically modulated to define the gear-shaped configuration and the internal boundary is substantially circular.

In yet another aspect of the present disclosure, both the internal and external boundaries are periodically modulated to define the gear-shaped configurations thereof and a slot is defined between the internal and external boundaries.

In another aspect of the present disclosure, the at least one waveguide includes first and second waveguides coupled to the ring on opposite sides thereof.

In still yet another aspect of the present disclosure, the ring is laterally-oriented or vertically-oriented.

In another aspect of the present disclosure, the ring is formed from a core material that is disposed on a substrate and/or includes a cladding material disposed thereon.

In another aspect of the present disclosure, the core material is one of: silicon nitride, silicon, gallium arsenide, indium phosphide, silicon carbide, diamond, lithium niobate, or aluminum nitride.

In yet another aspect of the present disclosure, the ring includes a cladding material disposed on the core material, wherein the cladding material is silicon dioxide.

BRIEF DESCRIPTION OF THE DRAWINGS

Various aspects and features of the present disclosure are described hereinbelow with reference to the drawings wherein:

FIG. 3 is a schematic illustration of an optical cavity illustrating aspects and features of the present disclosure and including first and second waveguides coupled thereto;

FIGS. 4A-4D illustrate a0, s0, s1, and s2 modes, respectively, of the optical cavity of FIG. 3;

FIGS. 7-12 are schematic illustrations of various other laterally-oriented optical cavities illustrating aspects and features of the present disclosure;

FIGS. 13-16 are schematic illustrations of various vertically-oriented optical cavities illustrating aspects and features of the present disclosure;

FIG. 17 is a schematic illustration of another optical cavity illustrating aspects and features of the present disclosure, including multiple physical defects, and shown coupled to first and second waveguides;

FIGS. 18A-18I illustrate various cross-sectional configurations of the optical cavities provided in accordance with the present disclosure; and FIG. 19 is a table of materials suitable for use in forming the optical cavities provided in accordance with the present disclosure.

DETAILED DESCRIPTION

Figure 2:
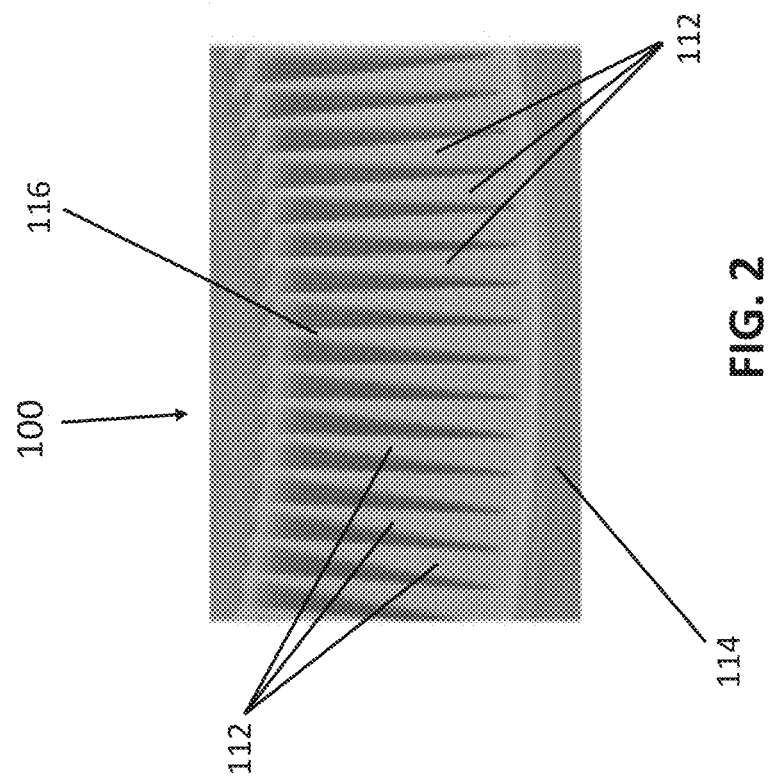
FIG. 2 is a greatly enlarged, perspective view of the portion of the optical cavity of FIG. 1 indicated as "2" in FIG. 1.
Figure 1:
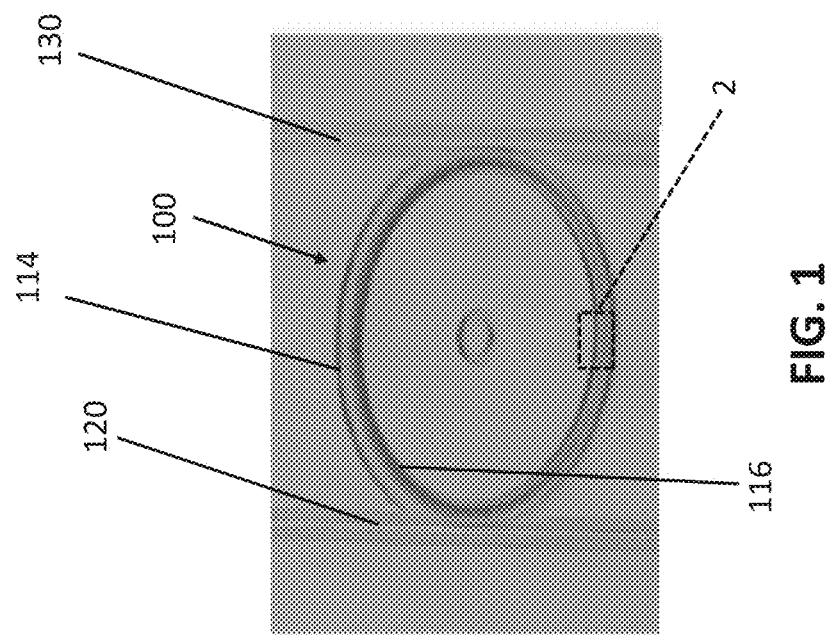
FIG. 1 is an enlarged, perspective view of an optical cavity provided in accordance with aspects of the present disclosure including first and second waveguides coupled thereto.

Turning to FIGS. 1 and 2, an optical cavity provided in accordance with the present disclosure shown generally identified by reference numeral 100 defines a ring-shaped configuration and includes first and second waveguides 120, 130, respectively, coupled thereto on opposing sides thereof. Optical cavity 100, more specifically, defines an internal gear-shaped configuration (e.g., including a plurality of inwardly-extending teeth 112) formed by maintaining the outside circular ring boundary or wall 114 of optical cavity 100 and modulating the inside ring boundary or wall 116 of optical cavity 100 with a relatively large amplitude and selected periods and lineshapes to open a relatively large bandgap. Optical cavity 100 is exemplary in nature and, as shown, defines an azimuthal angular momentum number, m, wherein m=162, and a modulation amplitude, A, wherein A=1150 nm.

With additional reference to FIGS. 3-4D, an optical cavity 300 is shown schematically defining a ring-shaped configuration and including first and second waveguides 320, 330, respectively, coupled thereto on opposing sides thereof. Optical cavity 300, having an azimuthal angular momentum number of m=8, is a simplified representation (to facilitate understanding) of optical cavity 100 (see FIGS. 1 and 2) and, similar thereto, defines an internal gear-shaped configuration formed by maintaining the outside circular ring boundary or wall 314 and periodically modulating the inside ring boundary or wall 316 with a relatively large amplitude to open a relatively large photonic bandgap at a targeted location in angular momentum space (e.g., at m=±m0). The modulation period is $\pi R/m_0$ (such that 2m0 periods fit the ring circumference).

Optical cavity 300 defines three types of symmetry: mirror symmetry (the symmetry of clockwise (CW) and counterclockwise (CCW) propagating light); symmetry in the angular momentum shift created by the periodic (in the azimuthal direction) modulation, which is a transition of modes from CCW to CW or from CW to CCW; and rotational symmetry due to the circular boundary condition, which leads to a quantized/integer angular momentum (m) and a discrete resonance frequency (Wm) for the slow light modes or Whispering Gallery Modes (WGMs).

The inside ring boundary modulation lineshape of optical cavity 300 can be defined according to the following equation:

$$R_{in}(\phi) = R_0 - RW - A|\cos(N\phi/2)|^S + A/2,$$

where $R_0$ is the outside radius, RW is the ring width, $R_{in}$ is the inside radius, $\phi$ represents the azimuthal angle from 0 to $2\pi$, A represents the modulation amplitude, N is the number of modulation periods within the ring circumference, and S regulates gear-like shape of the inside ring boundary (for example, S=2 represents a sinusoidal modulation; and S=1 represents a "folded" sinusoidal modulation). Suitable S values range from between and including 0.5 to 1.25 to maintain high Q, although other S values are also contemplated depending upon a particular configuration.

The modulation of inside ring boundary or wall 314 of optical cavity 300, as noted above, opens a relatively large photonic bandgap at a targeted location in angular momentum space (e.g., at m=±m0). This bandgap supports slow-light modes at and near the band edges. More specifically, slow light modes or WGMs a0 (FIG. 4A) and s0 (FIG. 4B) are established at the air band edge and dielectric band edge, respectively. Additional slow light modes or WGMs s1 and s2, shown in FIGS. 4C and 4D, respectively, are also established. s1 has the same spatial profile as s0 with an additional cos(φ)) modulation applied. Similarly, with respect to s2, the mode profile is modulated by an additional cos(φ) with respect to s0.

The above-detailed features of optical cavity 300 enable high-Q WGMs to be achieved with discrete angular momentum (described by the azimuthal mode number m) and frequency (w). More specifically, the slow-light modes or WGMs (at or near the dielectric band edge, s0) may define an optical quality factor (Q) of about or at least $(1.1\pm0.1)\times 10^6$ and a group velocity slowdown ratio (SR) value of about or at least 10. Further, with respect to another metric for slow-light applications, ng/α (where ng is the group index and α is the loss coefficient (which is directly proportional to Q)), the above-detailed features of optical cavity 300 enable about or at least ng/α=17 cm or, in other aspects, about or at least ng/α=28 cm. In addition to the above metrics, the above-detailed features of optical cavity 300 facilitate straightforward coupling of waveguides 320, 330 (or any other suitable number, orientation, and/or configuration of waveguides) while maintaining the ability to strongly manipulate the propagation and confinement of light.

Figures 5, 6A, 6B:
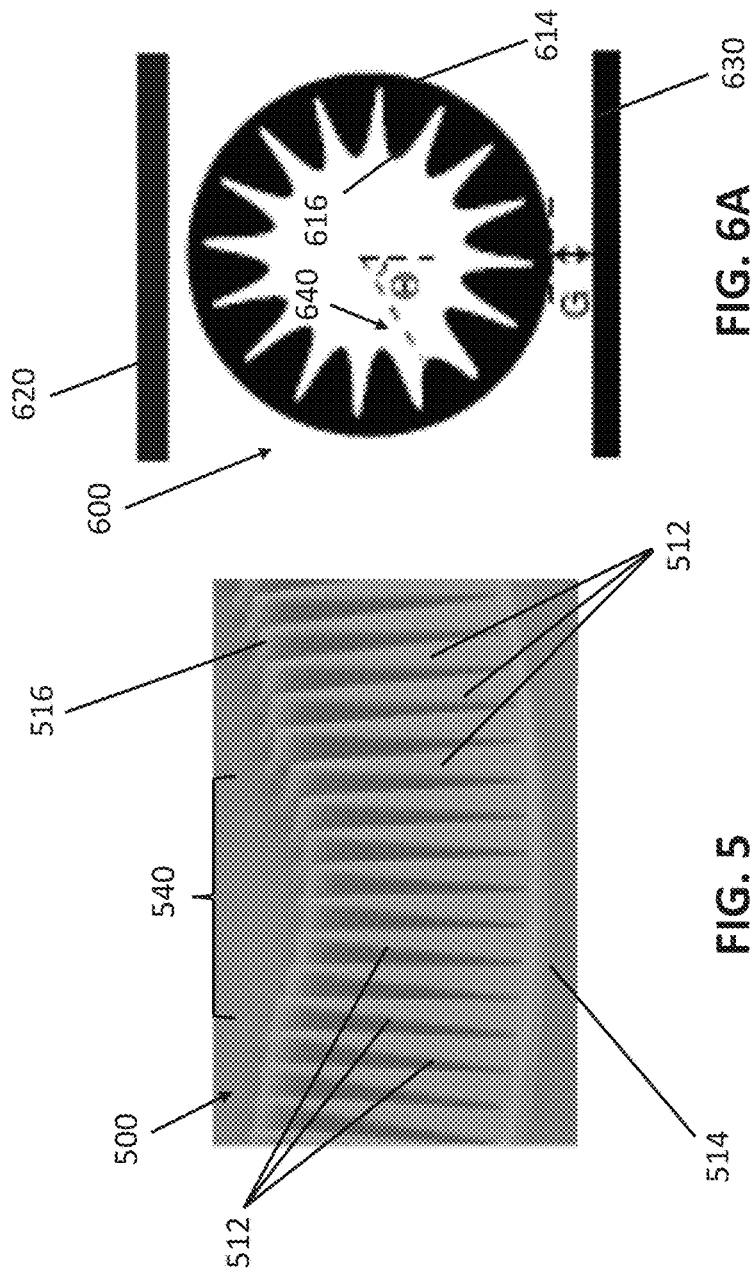
FIG. 5 is a greatly enlarged, perspective view of a portion of an optical cavity similar to the optical cavity of FIG. 1 except that the optical cavity further defines a physical defect.
FIG. 6A is a schematic illustration of another optical cavity illustrating aspects and features of the present disclosure, including first and second waveguides coupled thereto, and defining a physical defect.
FIG. 6B illustrates a defect mode (labeled g) of the optical cavity of FIG. 6A.

Turning to FIG. 5, another optical cavity 500 provided in accordance with the present disclosure defines a ring-shaped configuration and includes first and second waveguides 520, 530, respectively, coupled thereto on opposing sides thereof. Optical cavity 500 is similar to optical cavity 100 (FIGS. 1 and 2) in that optical cavity 500 defines an internal gear-shaped configuration (e.g., including a plurality of inwardly-extending teeth 512) formed by maintaining the outside circular ring boundary or wall 514 of optical cavity 500 and modulating the inside ring boundary or wall 516 of optical cavity 500, and in that optical cavity 500 defines m=162 and A=1150 nm. However, optical cavity 500 differs from optical cavity 100 (FIGS. 1 and 2) in that optical cavity 500 further includes a localized physical defect 540 introduced into the modulated inside ring boundary or wall 516. Localized physical defect 540, more specifically, may be a local perturbation of the modulation amplitude such as, for example, a reduction of modulation amplitude, e.g., wherein the modulation amplitude A is varied quadratically across a number of cells, n, wherein n=8 cells (four (4) on either side) with a maximum modulation-depth deviation (Δ) of 10% of A at the center of the localized physical defect 540 (as shown). Such a localized physical defect 540 induces a bound simple harmonic potential well that supports a ground-state mode g, as detailed below with respect to simplified optical cavity 600.

With additional reference to FIGS. 6A and 6B, an optical cavity 600 is shown schematically including a ring-shaped configuration and first and second waveguides 620, 630, respectively, coupled thereto on opposing sides thereof. Optical cavity 600, having an azimuthal angular momentum number of m=8, is a simplified representation (to facilitate understanding) of optical cavity 500 (see FIG. 5) and, similar thereto, defines an internal gear-shaped configuration formed by maintaining the outside circular ring boundary or wall 614 and periodically modulating the inside ring boundary or wall 616. Optical cavity 600 further includes a localized physical defect 640 introduced into the modulated inside ring boundary or wall 616.

As a result of localized physical defect 640, a localized mode is established with a frequency that is shifted from the dielectric band edge at s0 to a new frequency g (see FIG. 6B). This frequency or mode g is thus a localization of the s0 mode and has a higher resonance frequency that depends on the detailed parameters of the localized physical defect 640, while all other modes remain substantially the same. The frequency of g, more specifically, is established according to various parameters including A, m, n (the number of cells comprising the defect), and/or Δ. With respect to localized physical defect 640, n=1, although other suitable values for parameters A, m, n, and Δ may be selected such that, as noted above, a particular frequency of g can be established. Thus, establishing a high Q localized mode, g, is possible by selecting suitable parameters and without the need for detailed numerical simulations of electromagnetic designs to support a high Q.

While ng/α is a metric for slow-light modes as detailed above, a ratio of Q to mode volume (V), Q/V, is a metric for cavity-enhanced light-matter interactions (of a localized mode). The mode volume, V, can be reduced via introduction of a localized physical defect (e.g., defects 540,640), thereby improving Q/V. More specifically, the above-detailed features of optical cavity 600 enable reduction of the V value, in aspects, to about or at most $5.5(\lambda/n)^3$, in other aspects to about or at most $3.3(\lambda/n)^3$ and in still other aspects, to about or at most $(\lambda/n)^3$, where λ is the wavelength and n is the core waveguiding layer refractive index. With the above V values, the above-detailed features of optical cavity 600 enable a Q value (at or near the dielectric band edge, s0) of about or at least $Q=(4.0\pm0.1)\times10^5$ or, in other aspects, of about or at least $Q=(5.6\pm0.1)\times10^5$.

Continuing with reference to FIGS. 6A and 6B, exploiting enhanced light-matter interactions in optical cavities, e.g., optical cavity 600, requires effective input/output coupling between the waveguide(s) 620, 630 and the optical cavity 600. Two parameters that control this coupling are the defect angle (θ) and the waveguide-ring gap (G). In a rotated case, e.g., wherein θ=60°, g has a weaker coupling than in slow-light modes s1, s2 (see FIGS. 4C and 4D), whereas in a centered case, e.g., wherein θ=0°, g has a stronger coupling than in slow-light modes s1, s2 (see FIGS. 4C and 4D). Thus, the input/output couplings between the waveguide(s) 620, 630 and the optical cavity 600 can be selected to establish a desired θ for each waveguide 620, 630, depending upon a particular purpose. Stronger coupling can be realized by reducing G and/or by optimizing the waveguide width and pulley coupling.

Referring to FIGS. 7-12, optical cavities of the present disclosure may take various different forms while maintaining the features and advantages detailed above. For example, and with respect to lateral configurations, an optical cavity 700 (FIG. 7) may be provided with an internal gear-shaped configuration, similarly as detailed above with respect to optical cavity 300 (FIG. 3) (except that optical cavity 700 as illustrated defines m=6); another optical cavity 800 (FIG. 8) may be provided with an external gear-shaped configuration (wherein the inside ring boundary is maintained while the outside ring boundary is modulated); and still another optical cavity 900 (FIG. 9) may be provided with both internal and external gear-shaped configurations (wherein both the inside ring boundary and the outside ring boundary are modulated). Further, an optical cavity 1000 (FIG. 10) may be provided with an internal gear-shaped configuration in combination with a conventional (unmodulated) ring disposed annularly about the internal gear-shaped configuration (with a slot therebetween); or the reverse may be provided, that is, an optical cavity 1100 (FIG. 11) with an external gear-shaped configuration in combination with a conventional (unmodulated) ring disposed radially inwardly of the external gear-shaped configuration (with a slot therebetween). Further still, another optical cavity 1200 (FIG. 12) may be provided with both internal and external gear-shaped configurations and a slot disposed therebetween. The optical cavity configurations including slots provide a modified confinement of the electromagnetic field (e.g., enabling confinement of the field within the slot while still experiencing the group velocity slowing and localization induced by the modulated structure (and localized defect, if so provided). Any of optical cavities 700-1200 (FIGS. 7-12) may include localized physical defects such as those detailed above or otherwise herein.

Turning to FIGS. 13-16, as an alternative to the lateral implementations detailed above, vertical implementations are also contemplated. With respect to vertical implementations, an optical cavity 1300 (FIG. 13) can be provided combining any of the features of the optical cavities detailed above with a planar sheet of material in a vertical orientation, either with or without a gap therebetween. In configurations where there is no gap, this arrangement is substantially equivalent to partial etching of an optical cavity pattern. In other aspects, an optical cavity 1400 (FIG. 14), 1500 (FIG. 15) may be combined with another device such as, for example, a disk (FIG. 14) or a ring (FIG. 15). In still other aspects, another optical cavity 1600 (FIG. 16) can be combined with another similar or identical optical cavity such as, for example, to form a multi-layer stack (through etching or in any other suitable manner). Alternatively, two different optical cavities can be combined to form a multi-layer stack. With respect to multi-layer implementations, such as those noted above, a modified electromagnetic field in comparison to single-layer implementations is achieved such as, for example, where the field can become concentrated in a gap between layers.

FIG. 17 illustrates an optical cavity 1700 including a ring-shaped configuration having an internal gear-shaped configuration (although other configurations are also contemplated) with multiple localized physical defects 1740a, 1740b, and first and second waveguides 1720, 1730 coupled to optical cavity 1700. Although two localized physical defects 1740a, 1740b are shown, greater than two localized physical defects 1740a, 1740b are also contemplated.

In aspects, optical cavity 1700 is configured such that defects 1740a, 1740b are accessed by the waveguide 1730, while waveguide 1720 does not couple to defects 1740a, 1740b because defect 1740b is closer to waveguide 1730 and is overcoupled while the defect 1740b undercoupled. Waveguide 1720, though not coupling with defects 1740a, 1740b to provide defect modes (g modes), has better coupling to the band-edge (s) modes (e.g., those modes near and above 1545 nm) than waveguide 1730. Defects 1740a, 1740b are off-centered and centered, respectively, although both defects may be off-centered in other configurations. Optical cavity 1700 provides high-Q and good coupling similarly as detailed above and may be provided with any suitable number and/or configuration of defects.

With reference to FIGS. 18A-18I, the optical cavities of the present disclosure may be formed from a core 1850 and cladding(s)/substrate 1860, 1870. To confine light, core 1850 needs to have a higher refractive index than the cladding(s)/substrate 1860, 1870; however, various different configurations may be provided. For example, as shown in FIG. 18A, core 1850 may be symmetrically cladded that is, for example, fully surrounded by cladding 1860 (with the fully cladded core 1850 disposed on a substrate (not shown in FIG. 18A)). As shown in FIG. 18B, in other aspects, core 1850 is asymmetrically cladded, that is, for example, where cladding(s)/substrate 1860 is provided on one side and core 1850 is otherwise exposed to air or a different cladding 1870 on the other side. FIG. 18C illustrates a configuration wherein cladding/substrate 1860 supports core 1850 and defines an undercut configuration so that the optical field experiences an air cladding 1870 above, below, and to the sides of core 1850. Partial etching of core 1850 to form the optical cavities is also contemplated, as illustrated in FIGS. 18D-18F (note that the configuration of FIG. 18F may require releasing holes, slots or other features (not shown) defined through core 1850). With respect to vertical implementations of the optical cavity, FIGS. 18G-18I illustrate various cross-sectional configurations of core 1850 and one or more claddings 1860, 1870 of different refractive index (with one of the claddings 1870 disposed between the cores 1850) for such vertical implementations. Combinations of the above are also contemplated.

The optical cavities of the present disclosure may be formed utilizing various different materials. In aspects, the cladding material (or one of the cladding materials) is silicon dioxide, as it has lower index than other dielectric or semiconductor materials suitable for use as the core material (such as those detailed hereinbelow). Silicon dioxide can also be used as a core material if surrounded by air cladding, such as in some of the configurations detailed above. Further, different materials can be combined with one another to form the core and/or claddings, thus providing the benefits of multiple materials at the same time. Such may be particularly advantageous in vertical implementations. Additionally, phase-change materials (PCMs) may be utilized as either core materials or as functional layers disposed on or integrated into the core materials. PCMs can change refractive index across a large range, thus allowing index modulation. Similarly, ultra-violet (UV) light irradiation to photonic materials with UV responses (either using phase masks or patterned masks) and thermal annealing/processing of the materials/polymers (either pre-patterned or photo-activated) can also be utilized. A non-exhaustive list of suitable core materials is provided in the table of FIG. 19, along with the refractive index of each material (at 1550 nm), non-limiting advantages thereof, and non-limiting applications thereof.

With respect to wavelength, the aspects and features of the optical cavities of the present disclosure are not limited to 1550 nm implementations but, rather, are wavelength-agnostic; that is, the aspects and features of the optical cavities of the present disclosure can be applied to different targeted wavelengths depending upon a particular purpose (and provided that the materials are selected accordingly to exhibit optical transparency at the desired wavelengths). For example, with respect to color centers in diamond utilized for quantum applications (e.g., optical detection of magnetic resonance using single spins and quantum memories), optical cavities in accordance with the present disclosure can be utilized to promote light-matter interactions by scaling the geometry to operate at 637 nm (the transition wavelength of one of the diamond color centers) and in a diamond-on-SiO2 thin film. Similar applications hold in the SiC platform, which has a higher refractive index contrast than diamond and hosts color centers that operate at longer wavelengths (e.g., the near-infrared). As still another example, optical cavities in accordance with the present disclosure can be utilized in a GaAs platform, which hosts InAs quantum dots emitting in the 900 nm band, and which are used for quantum light sources.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawings are presented only to demonstrate certain examples of the disclosure. Other elements, steps, methods, and techniques that are insubstantially different from those described above and/or in the appended claims are also intended to be within the scope of the disclosure.

What is claimed is:

1. An optical cavity, comprising:
   a ring defining an internal boundary and an external boundary, at least one of the internal boundary or the external boundary being periodically modulated to define a gear-shaped configuration including a plurality of teeth, thereby enabling a plurality of slow-light modes wherein at least one slow-light mode of the plurality of slow-light modes has an optical quality factor (Q) of at least about $1.1 \times 10^6$ and a group velocity slowdown ratio (SR) of at least about 10; and
   at least one waveguide coupled to the ring.

2. The optical cavity according to claim 1, wherein the optical cavity defines mirror symmetry, symmetry in an angular momentum shift created by the periodic modulation, and rotational symmetry.

3. The optical cavity according to claim 1, wherein the internal boundary is periodically modulated to define the gear-shaped configuration, and wherein the external boundary is substantially circular.

4. The optical cavity according to claim 1, wherein the external boundary is periodically modulated to define the gear-shaped configuration, and wherein the internal boundary is substantially circular.

5. The optical cavity according to claim 1, wherein both the internal and external boundaries are periodically modulated to define the gear-shaped configuration, and wherein a slot is defined between the internal and external boundaries.

6. The optical cavity according to claim 1, wherein the at least one waveguide includes first and second waveguides coupled to the ring on opposite sides thereof.

7. The optical cavity according to claim 1, wherein the ring is laterally-oriented.

8. The optical cavity according to claim 1, wherein the ring is vertically-oriented.

9. The optical cavity according to claim 1, wherein the ring is formed from a core material, the core material at least one of: disposed on a substrate or including a cladding material disposed thereon.

10. The optical cavity according to claim 9, wherein the core material is one of: silicon, gallium arsenide, indium phosphide, silicon carbide, diamond, lithium niobate, or aluminum nitride.

11. The optical cavity according to claim 9, wherein the ring includes a cladding material disposed on the core material, and wherein the cladding material is silicon dioxide.

12. An optical cavity, comprising:
    a ring defining an internal boundary and an external boundary, the internal boundary being periodically modulated to define a gear-shaped configuration including a plurality of teeth, thereby enabling a plurality of slow-light modes, the external boundary being substantially circular,
    wherein the periodically modulated internal boundary includes at least one physical defect defined therein, thereby enabling at least one localized mode.

13. The optical cavity according to claim 12, further comprising at least one waveguide coupled to the ring.

14. The optical cavity according to claim 12, wherein at least one slow-light mode of the plurality of slow-light modes has an optical quality factor (Q) of at least about $1.1 \times 10^6$ and a group velocity slowdown ratio (SR) of at least about 10.

15. The optical cavity according to claim 12, wherein the at least one localized mode has a Q to mode volume (V) ratio (Q/V) of at most about $5.5(\lambda/n)^3$, where $\lambda$ is an operating wavelength and n is a refractive index of a core waveguiding layer of the ring.

16. The optical cavity according to claim 12, wherein the at least one physical defect includes a localized reduction in amplitude of at least one tooth of the plurality of teeth.

17. The optical cavity according to claim 12, further comprising a waveguide coupled to the ring, wherein the at least one physical defect defines a defect angle $\theta=0$ relative to the coupling of the waveguide with the ring.

18. An optical cavity, comprising:
    a ring defining an internal boundary and an external boundary, at least one of the internal boundary or the external boundary being periodically modulated to define a gear-shaped configuration including a plurality of teeth, thereby enabling a plurality of slow-light modes, wherein at least one slow-light mode of the plurality of slow-light modes has an ng/$\alpha$, wherein ng is the group index and $\alpha$ is the loss coefficient, of at least about 17 cm; and
    at least one waveguide coupled to the ring.

19. The optical cavity according to claim 18, wherein the optical cavity defines mirror symmetry, symmetry in an angular momentum shift created by the periodic modulation, and rotational symmetry.

20. The optical cavity according to claim 18, wherein the internal boundary is periodically modulated to define the gear-shaped configuration, and wherein the external boundary is substantially circular.

21. The optical cavity according to claim 18, the external boundary is periodically modulated to define the gear-shaped configuration, and wherein the internal boundary is substantially circular.

22. The optical cavity according to claim 18, wherein both the internal and external boundaries are periodically modulated to define the gear-shaped configuration, and wherein a slot is defined between the internal and external boundaries.

23. An optical cavity, comprising:
    a ring defining an internal boundary and an external boundary, at least one of the internal boundary or the external boundary being periodically modulated to define a gear-shaped configuration including a plurality of teeth, thereby enabling a plurality of slow-light modes, wherein the periodically modulated at least one of the internal boundary or the external boundary includes at least one physical defect defined therein, thereby enabling at least one localized mode; and
    at least one waveguide coupled to the ring.

24. The optical cavity according to claim 23, wherein the internal boundary is periodically modulated to define the gear-shaped configuration.

25. The optical cavity according to claim 23, the external boundary is periodically modulated to define the gear-shaped configuration.

26. The optical cavity according to claim 23, wherein both the internal and external boundaries are periodically modulated to define the gear-shaped configuration, and wherein a slot is defined between the internal and external boundaries.

27. The optical cavity according to claim 23, wherein the at least one localized mode has an optical quality factor (Q) to mode volume (V) ratio (Q/V) of at most about $5.5(\lambda/n)^3$, where λ is an operating wavelength and n is a refractive index of a core waveguiding layer of the ring.

28. The optical cavity according to claim 23, wherein:
at least one slow-light mode of the plurality of slow-light modes has an optical quality factor (Q) of at least about $1.1 \times 10^6$ and a group velocity slowdown ratio (SR) of at least about 10, and
at least one slow-light mode of the plurality of slow-light modes has an ng/α, wherein ng is the group index and α is the loss coefficient, of at least about 17 cm.

* * * * *